(12) United States Patent
Moran et al.

(10) Patent No.: US 6,562,383 B1
(45) Date of Patent: May 13, 2003

(54) PROCESS FOR PRODUCING FLAVORED CHEESE WITHOUT CURING

(75) Inventors: James W. Moran, Antioch, IL (US); Michael A. Hyde, Wheeling, IL (US); Steven Havlik, South Elgin, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 10/133,459

(22) Filed: Apr. 26, 2002

(51) Int. Cl.$^7$ ................................................ A23C 9/12
(52) U.S. Cl. .............................. 426/36; 426/34; 426/35; 426/534; 426/535; 426/580; 426/582; 426/650
(58) Field of Search ............................... 426/34, 35, 36, 426/37, 38, 39, 40, 534, 535, 580, 582, 650

(56) References Cited

U.S. PATENT DOCUMENTS

| 4,119,732 A | | 10/1978 | Kratochvil |
| 4,172,900 A | | 10/1979 | Dooley |
| 4,244,971 A | | 1/1981 | Wargel et al. |
| 4,675,193 A | * | 6/1987 | Boudreaux .................... 426/35 |
| 4,752,483 A | | 6/1988 | Hagberg et al. |
| 4,820,530 A | | 4/1989 | Moran et al. |
| 5,262,183 A | | 11/1993 | Moran et al. |
| 6,054,151 A | * | 4/2000 | Kwon et al. .................... 426/36 |
| 6,251,445 B1 | | 6/2001 | Han et al. |
| 6,406,724 B1 | * | 6/2002 | Reddy et al. ................... 426/34 |

* cited by examiner

*Primary Examiner*—Leslie Wong
(74) *Attorney, Agent, or Firm*—Fitch, Even, Tabin & Flannery

(57) ABSTRACT

A process for producing a flavored cheese that does not require curing or aging is provided. Using three specific flavor components (i.e., a "sulfury-cheddar" flavored component, a "creamy-buttery" flavored component, and a "cheesy" flavored component), a wide variety of flavored cheeses having desired flavor profiles and of various types can be prepared using a simple process that does not require a curing or aging step. Depending on the type of cheese desired, a mixture of at least one, and preferably at least two, of the flavor components is prepared. A non-coagulating amount of a cheese coagulate is added and sufficient water is removed, preferably by evaporation, to obtain the desired solids level, thereby forming the desired flavored cheese.

48 Claims, 2 Drawing Sheets

PROCESS FOR PRODUCING FLAVORED CHEESE WITHOUT CURING

FIELD OF THE INVENTION

The present invention relates generally to a process for producing a flavored cheese, including highly-flavored cheese, that does not require curing or aging. This process of this invention allows the preparation of a wide variety of flavored cheeses having desired flavor profiles using a simple process that does not require a curing or aging step. Moreover, the process of this invention allows the rapid production of various types of cheeses, including process, natural, and cream cheeses, depending on current market demands or needs.

BACKGROUND OF THE INVENTION

Natural cheese is generally made by developing acidity in milk and setting the milk with a clotting agent, such as rennet, or by developing acidity to the isoelectric point of the protein. The set milk is cut and whey is separated from the resulting curd. The curd may be pressed to provide a cheese block. Curing typically takes place over a lengthy period of time under controlled conditions. Cheddar cheese, for example, is cured for a period of at least four months and may be cured for a period in excess of one year to obtain the full flavor desired in cheddar cheese.

It is well known to provide a product having some of the characteristics of natural cheese by grinding a natural cheese, and heating it with an emulsifying salt. The name given to the resulting product depends upon the ingredients used and its composition and, in some instances, is determined by regulations promulgated by the U.S. Food and Drug Administration 21 C.F.R. §133.169-180. For example, the term "pasteurized process cheese" refers to a product comprising a blend of cheeses to which an emulsifying agent, usually an emulsifying salt, and possibly acids, have been added, and which has then been worked and heated into a homogeneous plastic mass. The flavor of process cheese is dependent on utilizing a high proportion of long hold (aged over four months) natural cheese. The use of long hold cheese increases the cost of process cheese due to storage and inventory costs. The yield of natural cheese produced by conventional methods is relatively low; generally about 7–12 pounds of cheese are produced per 100 pounds of milk. This also increases costs.

The term "pasteurized process cheese food" refers to a product which is prepared from the same materials and the same processes used for manufacture of process cheese. However, such cheese foods generally have dairy ingredients added thereto, such as cream, milk, skimmed milk, whey, or any of these from which part of the water has been removed (e.g., concentrated skimmed milk). The moisture level in process cheese food is generally higher than that of process cheese and may be up to about 44 percent. Fat is generally present at a level of not less than 23 percent.

The term "pasteurized process cheese spread" refers to a product which is similar to cheese food, in the sense that it can contain the indicated dairy ingredients. Process cheese spreads, however, may have moisture levels as high as 60 percent and minimum fat levels of 20 percent.

Process cheese, process cheese food, and process cheese spread are referred to as "standardized products" since their methods of manufacture and composition are determined by Federal Standards of Identity.

As used herein, the term "process cheese-type products" includes those products known and referred to as "pasteurized process cheese," "pasteurized process cheese food," "pasteurized process cheese spread," and "pasteurized process cheese product." "Process cheese type-products" also includes products resembling process cheese, process cheese food, process cheese spread, and process cheese product, but which may not meet the U.S. Federal Standards of Identity for any of the above products in that they may contain ingredients not specified by such Standards, such as vegetable oil or vegetable protein, or may not meet the compositional requirements of such Standards. Process cheese-type products also include products having flavor and texture similar to those of a process cheese-type product regardless of the ingredients or manufacturing steps employed, and regardless of whether the Standards have been met.

There have been many efforts to produce a naturally derived highly flavored cheese ingredient, which can be used in process cheese, in a shortened period of time. For example, U.S. Pat. No. 4,752,483 is directed to a method for producing a highly flavored cheese ingredient. In this process, cheese curd is first produced, the resulting "green" cheddar-type cheese curds are ground and then combined with a protease, a lipase, and water and then incubated for about 5 to 6 days. The term "green" cheddar-type cheese curd refers to a cheddar cheese which has been aged less than about 60 days. To develop appropriate flavor, such "green" cheddar-type cheese curd and enzyme mixtures must still be cured.

U.S. Pat. No. 4,172,900 is directed to producing a natural cheese product having a highly intensified American cheese flavor which is adapted for use in the preparation of process cheese. In the method, cheese curd is produced in the usual way, wherein a coagulum is produced from milk, the coagulum is cut to produce curds and whey, and the whey is drained to provide cheese curds. The curd particles are produced, mixed with salt, a source of lipolytic enzyme, and a source of a proteolytic enzyme and then cured for a period of time sufficient to produce increased levels of $C_2$–$C_{10}$ fatty acids, as compared to conventional American-type cheese.

U.S. Pat. No. 4,119,732 is directed to a method for rapidly producing cheese. In this method, rennet, kid lipase, and calf lipase are mixed with milk during the fermenting period. The milk is then coagulated and cut into curd particles followed by processing by the normal procedure for producing cheddar cheese, which includes a whey draining step. The curd is formed into a cheese block and the cheese block is aged for about 10 weeks to provide an intense aged cheddar cheese flavor.

U.S. Pat. No. 3,975,544 describes a method for producing cheddar cheese from pasteurized milk wherein an enzyme mixture is added to cheddared curds to substantially reduce the curing time of the cheese block. The cheese blocks are cured for a period of one month at 10 to 25° C.

U.S. Pat. No. 4,244,971 is directed to a process for the rapid manufacture of cheese products. In the process, a cultured cheese component is prepared by proteolyzing milk protein and by lipolyzing milkfat and forming a mixed fermentate of these hydrolyzed materials. The mixed fermentate is combined with a cheese starter culture and fermented to provide the cultured cheese component. The cultured cheese component is then mixed with a milk protein concentrate and a fat concentrate. This mixture is fermented to provide a cheese material capable of being made into process cheese type products by conventional cheese cooking techniques.

U.S. Pat. No. 4,820,530 (Apr. 11, 1989) is directed to a process for the production of high solids curd and cheese by fermenting a milk retentate with a cheese-making culture and then evaporating moisture. A milk clotting enzyme may be added after fermentation and before evaporation in an amount insufficient to cause coagulation which is avoid prior to curd formation. If a cutting cheese is desired, curing or aging is required.

U.S. Pat. No. 5,262,183 (Nov. 16, 1993) provides a pre-cheese which can be converted into natural cheese. The pre-cheese is prepared by fermenting a retentate a cheese-making culture without coagulation, adding a milk clotting enzyme in a non-coagulating amount, evaporating moisture, and holding the pre-cheese under curing conditions for conversion of at least about 65 percent of the kappa casein to para kappa casein. Normally, this curing period is at least about 3 to 14 days long.

Co-pending U.S. patent application Ser. No. 09/314,713, filed on May 19, 1999 (now U.S. Pat. No. 6,251,445; Jun. 26, 2001), and owned by the same assignee as the present application, provided a method for making enzyme-modified cheese flavorings in which treatment with a proteolytic enzyme occurred prior to any heating step, and in which the enzyme treatment was relatively short (i.e., normally less than about 12 hours). This process included the steps of: (i) contacting a dairy liquid containing whey protein with a proteolytic enzyme to provide a dairy reaction mixture; (ii) incubating the dairy reaction mixture at a temperature and for a period of time that are sufficient to partially hydrolyze proteins; (iii) pasteurizing the partially hydrolyzed dairy reaction mixture; (iv) contacting the pasteurized mixture with a composition comprising a lipase and a cheese culture and incubating for a time and at a temperature that are sufficient for cheese flavor to develop; and (v) treating the fermented mixture with heat sufficient to inactivate the culture, destroy microbial contaminants, and inactivate the enzymes; thereby providing the enzyme-modified cheese flavoring.

Co-pending U.S. patent application Ser. No. 09/141,082, filed on Aug. 27, 1998, now abandoned and also owned by the same assignee as the present application, provided a method for producing a highly flavored component for use in cheese manufacture in a short period of time without utilizing a whey draining step or producing cheese curds. A cheese flavor precursor (i.e., an aqueous, acidified protein, and fat substrate) was prepared by mixing together a dried or concentrated protein source, a fat source, an acid source, and water. An enzyme system was then added to the substrate. The enzyme system included a lipase, a protease, and a peptidase. The substrate was then fermented for a time sufficient to provide a highly developed cheese flavor in the substrate. The substrate was then heated to a temperature and held at that temperature for a time sufficient to inactivate the enzyme system.

Although these methods generally provide highly flavored cheese components, they are generally limited to flavor profiles suitable for producing only a single type of flavored cheese. Thus, it was not possible to produce cheeses having widely differing and desirable flavor profiles using these methods. Moreover, none of these methods produce highly flavored cheese components having, or contributing to, sharp cheddar notes.

More recently, co-pending U.S. patent application Ser. No. 09/659,459, filed on Sep. 12, 2000, now U.S. Pat. No. 6,406,724, and also owned by the same assignee as the present application, provided a cheese flavoring system whereby cheeses having desirable and widely varying flavor profiles could be prepared. A cheese flavoring system containing only three flavor components was provided which could be used to duplicate a wide variety of desirable flavored cheeses. Three flavor components, namely a "sulfury-cheddar" flavored component, a "creamy-buttery" flavored component, and a "cheesy" flavored component, were provided. The flavor concentrates could be added to a milk substrate which is then treated to produce the desired cheese. Alternatively, the flavor concentrates could be added to a cheese or dairy base (i.e., a cheese curd and/or dairy solids lacking the desired flavor profile) to produce the desired cheese. In these methods, the desired flavor components were added to a dairy product (i.e., milk substrate or cheese base) to provide the desired cheese product. Thus, in addition to providing the flavor components, a separate cheese-making process would still be required. Using the flavor components in a milk substrate, for example, the flavor component-containing milk substrate must be treated in a cheese making process to obtain the desired cheese. Using the flavor components with a cheese base, it is, of course, necessary to prepare the cheese base using conventional cheese making techniques.

It would be desirable, therefore, to provide a method whereby the flavor components could be used directly to provide a cheese product. In other words, it would be desirable to provide a method whereby the flavor components could be used to produce a cheese product without requiring further cheese-making processes. It would also be desirable to provide a method to produce such a cheese product wherein the cheese product does not require further curing or aging. The present invention provides such methods.

SUMMARY OF THE INVENTION

The present invention relates generally to a process for producing a flavored cheese that does not require curing or aging. This process of this invention allows the preparation of a wide variety of flavored cheeses having desired flavor profiles using a simple process that does not require a curing or aging step. Moreover, the process of this invention allows the rapid production of various types of cheeses, including process, natural, and cream cheeses, depending on current market demands or needs.

The present invention uses the flavor components of co-pending U.S. patent application Ser. No. 09/659,459, filed on Sep. 12, 2000, now U.S. Pat. No. 6,406,724, (and which is hereby incorporated by reference in its entirety), in a direct, simple, and very efficient process to provide a wide variety of flavored, including highly-flavored, cheeses which do not require curing or aging. These flavor components include a "sulfury-cheddar" flavored component, a "creamy-buttery" flavored component, and a "cheesy" flavored component. Using these three components, a wide variety of flavored cheeses can be prepared. Moreover, the process of this invention does not require a further cheese-making operation.

The present invention provides a process for making a flavored cheese, said process comprising:

(1) forming a first concentrate mixture containing one, two, or three cheese-favor concentrates selected from the group consisting of a sulfur-cheddar concentrate, a creamy-buttery concentrate, and a cheesy concentrate and wherein the cheese-flavor concentrate or concentrates in the first concentrate mixture are selected to achieve a desired flavor profile in the flavored cheese;

(2) combining a cheese coagulant in a non-coagulating amount with the first concentrate mixture to provide a second concentrate mixture; and (3) removing moisture from the second concentrate mixture to a solids level of less than about 75 percent to form the flavored cheese, wherein the flavored cheese does not require curing;

wherein the sulfur-cheddar concentrate is obtained by treating a first milk concentrate with a lactic acid culture at a temperature of about 70 to about 90° F. for about 10 to about 24 hours to obtain first mixture having a pH of about 5.4 or less, adding a sulfur-containing substrate to the first mixture to form a second mixture, treating the second mixture with a Brevibacterium culture (preferably a *Brevibacterium linens* culture) or a yeast from the genera Debaromyces or Kluyeromyces, whereby the Brevibacterium culture or the yeast converts the sulfur-containing substrate to sulfur-containing flavor compounds, at a temperature of about 65 to about 86° F. for about 1 to about 10 days to form a third mixture, and treating the third mixture at a temperature sufficient to inactivate the cultures and enzymes in the third mixture to form the sulfury-cheddar flavor component;

wherein the creamy-buttery concentrate is obtained by treating a second milk concentrate with a lactic acid culture at a temperature of about 70 to about 90° F. for about 10 to about 24 hours to form a fourth mixture, adding sodium citrate to the fourth mixture to form a fifth mixture, treating the fifth mixture with a diacetyl-producing flavor culture at about 70 to about 90° F. for about 1 to about 10 days to form a sixth mixture, and treating the sixth mixture at a temperature sufficient to inactivate the cultures and enzymes in the sixth mixture to form the creamy-buttery flavor component; and wherein the cheesy concentrate is obtained by treating a third milk concentrate with a lipase, a protease, and a peptidase at a temperature of about 60 to about 140° F. for about 0.5 to about 10 days to form a seventh mixture and treating the seventh mixture at a temperature sufficient to inactivate enzymes in the seventh mixture to form the cheesy flavor component.

The present invention also provides a process for making a flavored cheese, said process comprising:

(1) forming a first concentrate mixture consisting essentially of one, two, or three cheese-favor concentrates selected from the group consisting of a sulfur-cheddar concentrate, a creamy-buttery concentrate, and a cheesy concentrate and wherein the cheese-flavor concentrate or concentrates in the first concentrate mixture are selected to achieve a desired flavor profile in the flavored cheese;

(2) combining a cheese coagulant in a non-coagulating amount with the first concentrate mixture to provide a second concentrate mixture; and (3) evaporating moisture from the second concentrate mixture to a solids level of less than about 75 percent to form the flavored cheese, wherein the flavored cheese does not require curing;

wherein the sulfur-cheddar concentrate is obtained by treating a first milk concentrate with a lactic acid culture at a temperature of about 70 to about 90° F. for about 10 to about 24 hours to obtain first mixture having a pH of about 5.4 or less, adding a sulfur-containing substrate to the first mixture to form a second mixture, treating the second mixture with a Brevibacterium culture (preferably a *Brevibacterium linens* culture) or a yeast from the genera Debaromyces or Kluyeromyces, whereby the Brevibacterium culture or the yeast converts the sulfur-containing substrate to sulfur-containing flavor compounds, at a temperature of about 65 to about 90° F. for about 1 to about 10 days to form a third mixture, and treating the third mixture at a temperature sufficient to inactivate the cultures and enzymes in the third mixture to form the sulfury-cheddar flavor component;

wherein the creamy-buttery concentrate is obtained by treating a second milk concentrate with a lactic acid culture at a temperature of about 70 to about 90° F. for about 10 to about 24 hours to form a fourth mixture, adding sodium citrate to the fourth mixture to form a fifth mixture, treating the fifth mixture with a diacetyl-producing flavor culture at about 70 to about 90° F. for about 1 to about 10 days to form a sixth mixture, and treating the sixth mixture at a temperature sufficient to inactivate the cultures and enzymes in the sixth mixture to form the creamy-buttery flavor component; and wherein the cheesy concentrate is obtained by treating a third milk concentrate with a lipase, a protease, and a peptidase at a temperature of about 60 to about 140° F. for about 0.5 to about 10 days to form a seventh mixture and treating the seventh mixture at a temperature sufficient to inactivate enzymes in the seventh mixture to form the cheesy flavor component.

The present invention also provides a process for making a flavored cheese, said process comprising:

(1) forming a concentrate mixture containing one, two, or three cheese-favor concentrates selected from the group consisting of a sulfur-cheddar concentrate, a creamy-buttery concentrate, and a cheesy concentrate and wherein the cheese-flavor concentrate or concentrates in the first concentrate mixture are selected to achieve a desired flavor profile in the flavored cheese; and (2) removing moisture from the concentrate mixture to a solids level of less than about 75 percent to form the flavored cheese, wherein the flavored cheese does not require curing;

wherein the sulfur-cheddar concentrate is obtained by treating a first milk concentrate with a lactic acid culture at a temperature of about 70 to about 90° F. for about 10 to about 24 hours to obtain first mixture having a pH of about 5.4 or less, adding a sulfur-containing substrate to the first mixture to form a second mixture, treating the second mixture with a Brevibacterium culture or a yeast from the genera Debaromyces or Kluyeromyces, whereby the Brevibacterium culture or the yeast converts the sulfur-containing substrate to sulfur-containing flavor compounds, at a temperature of about 65 to about 86° F. for about 1 to about 10 days to form a third mixture, and treating the third mixture at a temperature sufficient to inactivate the cultures and enzymes in the third mixture to form the sulfury-cheddar flavor component;

wherein the creamy-buttery concentrate is obtained by treating a second milk concentrate with a lactic acid culture at a temperature of about 70 to about 90° F. for about 10 to about 24 hours to form a fourth mixture, adding sodium citrate to the fourth mixture to form a fifth mixture, treating the fifth mixture with a diacetyl-producing flavor culture at about 70 to about 90° F. for about 1 to about 10 days to form a sixth mixture, and treating the sixth mixture at a temperature sufficient to inactivate the cultures and enzymes in the sixth mixture to form the creamy-buttery flavor component; and wherein the cheesy concentrate is obtained by treating a third milk concentrate with a lipase, a protease, and a peptidase at a temperature of about 60 to about 140° F. for about 0.5 to about 10 days to form a seventh mixture and treating the seventh mixture at a temperature sufficient to inactivate enzymes in the seventh mixture to form the cheesy flavor component.

DETAILED DESCRIPTION OF THE INVENTION

The present invention uses the flavor components provided in co-pending U.S. patent application Ser. No. 09/659,459, now U.S. Pat. No. 6,406,724. In order to describe the present invention, the use of these flavor components to produce a flavored cheese will be described in detail followed by a detailed description of the production of the flavor components.

Figure 1:
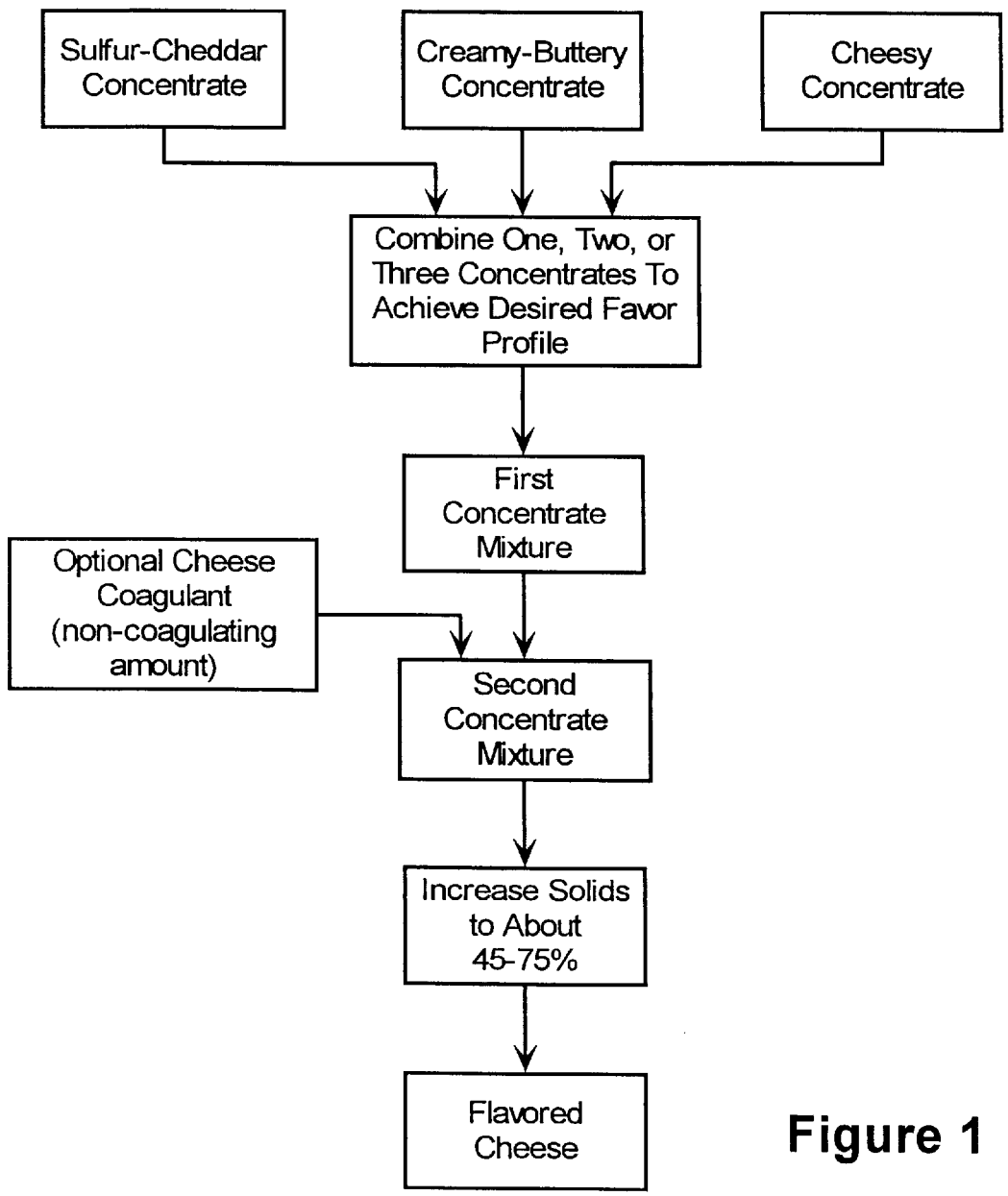
FIG. 1 generally illustrates the preparation of a flavored cheese using the process of this invention.

Preparation of Flavored Cheese. The method of the present invention is generally illustrated in FIG. 1. At least one of the flavor concentrates are used to provide a first concentrate mixture having the desired flavor profile in the resulting cheese. Preferably, at least two of the flavor concentrates are combined to provide a first concentrate mixture having the desired flavor profile in the resulting cheese. A non-coagulating amount of a cheese coagulant is added to the first concentrate mixture to form the second concentrate mixture in which the cheese coagulant is homogenous dispersed. For purposes of this invention, a non-coagulating amount of the cheese coagulant can be as low as zero (i.e., no cheese coagulant added); preferably, however, the cheese coagulant is added in an amount greater than zero but less than an amount sufficient to cause coagulation. The cheese coagulant can be added at any time prior to the moisture removal or evaporation step.

Generally, each of the flavor concentrates as prepared has a moisture content of about 45 to 85 percent. The first concentrate mixture will preferably have a moisture content of about 50 to about 80 percent; the second concentrate mixture preferably has a moisture content of about 50 to about 80 percent. If necessary, water may be added to either the first or the second concentrate mixture to obtain the desired moisture levels; in most cases where the flavor concentrates are used as manufactured, water addition will not be required. If desired, the flavor concentrates can be further concentrated and/or dried (e.g., spray dried) for later reconstitution with water. In such cases, water should be added to the first concentration mixture to achieve the desired water or moisture levels.

The solid levels of the second concentrate mixture is then increased, preferably by evaporation, to about 40 to about 75 percent, preferably to about 45 to about 70 percent, to obtain the flavored cheese. The flavored cheese is immediately ready for use; in other words, the flavored cheese does not require curing or aging. In fact, flavor characteristics do not significantly change with storage under refrigeration temperatures. Normally, the shelf-life of the flavored cheeses prepared by the method of this invention is about 6 to 12 months under refrigeration temperatures. If desired, sorbic acid can be added to improve shelf-life. Preferably, the total amount of sorbic acid in the final product is in the range of about 0.01 to about 0.5 percent and more preferably in the range of about 0.1 to about 0.2 percent. Such sorbic acid addition may be to one or more of the individual flavor components and/or during the preparation of the final flavored cheese product and/or to the final flavored cheese product.

The amount of coagulant added to form the second concentrate mixture is such that the second concentrate mixture does not coagulate within about 15 minutes under ambient conditions (i.e., about 60 to 90° F.). The non-coagulating amount can easily be determined using routine experimentation; the non-coagulating amount will normally depend of the specific enzyme used as well as the temperature, solids content, and calcium content of the second concentrate mixture. Suitable cheese coagulants or coagulating enzymes include, for example, calf rennet, veal rennet, microbial rennets (e.g., *Rhizomucor miehei* rennet and *Rhizomucor pusillus* rennet), fungus-derived rennets, chymosin, fermentation-produced chymosin, bovine pepsin, porcine pepsin, and the like.

After addition of the non-coagulating amount of the coagulating enzyme, the second concentrate mixture generally has a moisture content of about 44 to about 85 percent, and more preferably, about 50 to about 80 percent. Moisture is then removed from the second concentrate, preferably by evaporation. Moisture removal must be begun before the second concentrate mixture begins to coagulate. Normally, moisture removal should be initiated within about 15 minutes, preferably within about 10 minutes of the time of the coagulation enzyme addition; most preferably, moisture removal is initiated almost immediately after the coagulation enzyme has been added and homogenous dispersed in the second concentrate mixture.

Moisture removal is preferably effected using evaporation techniques including, but not limited to, drum evaporators, vacuum drum evaporators, laminar or turbulent flow evaporators, vacuum laminar or turbulent flow evaporators, and the like. Evaporation may be under non-turbulent or turbulent conditions; generally, turbulent conditions are preferred. Preferably, evaporation is carried out as described in U.S. Pat. No. 4,820,530 (Apr. 11, 1989) and U.S. Pat. No. 5,262,183 (Nov. 16, 1993), both of which are hereby incorporated by reference in their entireties. Preferably, evaporation is carried out under a vacuum (generally about 10 to about 150 torr) and at a temperature below the flash temperature of the feed material (generally about 60 to 140° F.; more preferably about 68 to about 90° F.) until the desired solids content is obtained.

By varying the flavor components used, and the amounts of the flavor components used, various flavored cheeses can be prepared. The following table illustrates the type of cheeses that can be prepared using the method of this invention.

| | Ratio of Flavor Components | | |
| --- | --- | --- | --- |
| Cheese | Sulfur-Cheddar | Creamy-Buttery | Cheesy |
| Mild Cheddar | — | 2 | 1 |
| Medium Cheddar | 1 | 2 | 1 |
| Sharp Cheddar | 3 | 2 | 1 |
| Extra Sharp Cheddar | 3 | 2 | 2 |
| Cream Cheese | — | 1 | — |
| Mozzarella Cheese | — | 3 | 1 |

Preparation of the Flavor Components. As noted, the present invention uses the flavor components provided in co-pending U.S. patent application Ser. No. 09/659,459, now U.S. Pat. No. 6,406,724. The starting material for preparing the flavor components is a milk concentrate or substrate in the form of an aqueous protein and fat-containing mixture. Although it is generally preferred, largely for convenience, that the same or similar milk concentrate composition is used to prepare each of the three flavor components of the present cheese flavoring system, separate milk concentrate compositions can be used to prepare each of the three flavor components if desired. The aqueous milk-derived concentrate or concentrates (i.e., highly concentrated milk system) generally have total solids contents of about 30 to about 50 percent, protein contents of about 10 to about 19 percent, fat contents of about 15 to about 30 percent, and lactose contents of about 0.1 to about 10 percent. Preferably, the aqueous milk-derived concentrates have total solids contents of about 35 to about 47 percent, protein contents of about 12 to about 17 percent, fat contents of about 18 to about 25 percent, and lactose contents of about 0.5 to about 5 percent. The moisture levels of the substrate are generally from about 50 to about 70 percent, preferably from about 53 to about 65 percent. The protein source can be a dried protein or concentrated material and is preferably a dairy ingredient, such as milk protein concentrate, fractionated milk protein, whey protein concentrate, dried whey, non-fat dry milk, or mixtures thereof. The fat source is preferably a milkfat such as anhydrous milkfat, butter, cream, concentrated milkfat, or mixtures thereof. Other protein sources, such as soy protein, corn protein, wheat protein, and/or rice protein can be used. Other non-dairy fat sources, such as vegetable oil, can be used. The pH of the milk concentrate or substrate is generally in the range of about 6 to about 7 and preferably in the range of about 6.5 to about 6.7.

A dried protein source, if used, is reconstituted with water. The water is used at a level sufficient to provide a total moisture of from about 50 to about 70 percent, preferably from about 53 to about 65 percent in the substrate. The reconstituted protein source is combined with the fat source to provide the substrate. If necessary, the pH of the substrate can be lowered to the proper range (i.e., about 4.6 to about 6.0 and preferably about 4.8 to about 5.6) by the addition of an edible acid or by use of a lactic acid producing microorganism. Suitable edible acids are non-toxic, inorganic or organic acids, which include hydrochloric acid, acetic acid, maleic acid, tartaric acid, citric acid, phosphoric acid, lactic acid, and mixtures thereof. In preparing the milk concentrate, a homogenization device can be used, if desired and/or necessary, to reduce the fat droplet particle size and insure homogeneity of the substrate.

Preferably, the aqueous milk-derived concentrate or substrate is a fluid milk concentrate prepared by ultrafiltration (alone or even more preferably combined with diafiltration) or a reconstituted milk substrate prepared from a mixture of an ultrafiltered (UF) or ultrafiltered/diafiltered (UF/DF) milk powder and milkfat. Preferably, the starting material is an UF/DF milk having the following characteristics:

|  | Typical (%) | Preferred (%) | More Preferred (%) |
| --- | --- | --- | --- |
| Total Solids | 30–50 | 35–47 | 40 |
| Moisture | 50–70 | 53–65 | 60 |
| Fat | 15–30 | 18–25 | 21 |
| Protein | 10–19 | 11–17 | 14.5 |
| Lactose | 0.1–10 | 0.5–5 | 1 |
| Salt | 1–3 | 1–2 | 1–2 |

-continued

|  | Typical (%) | Preferred (%) | More Preferred (%) |
| --- | --- | --- | --- |
| Ash | 0.5–2.5 | 1–2 | 1–2 |
| pH | 6–7 | 6.5–6.7 | 6.6 |

Preferred starting materials can prepared from mixtures of pasteurized whole or skim milk with added cream (0 to about 20 percent, preferably about 2 to about 15 percent). The milk substrate is then heated to about 1 10 to about 140° F., preferably to about 120° F., in a heat exchanger and then subjected to conventional ultrafiltration/dilfration techniques to produce an about 3× to about 8× (preferably about 5×) milk concentrate product. After heating at, for example, 168° F. for about 16 seconds and cooling to about 70 to about 80° F., the milk concentrate substrate can be used to prepare the specific flavoring components of the present invention. Preferably, about 1 to about 2 percent salt is added to the milk concentrate substrate prior to treatment with the various enzymes/cultures/additives to produce the specific flavoring components. The milk concentrate is a relatively viscous liquid, preferably containing about 35 to about 47 percent solids.

Figure 2:
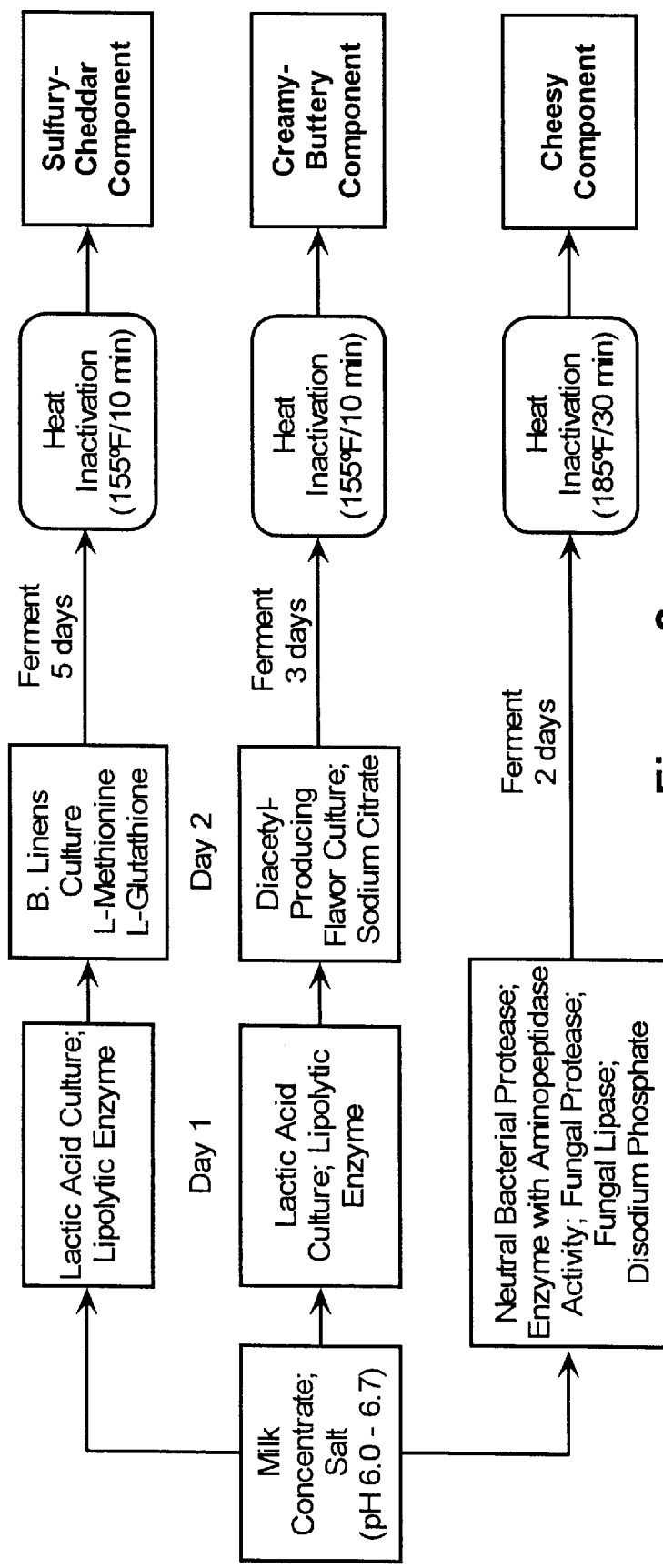
FIG. 2 generally illustrates the preparation of the sulfury-cheddar flavor component, the creamy-butter flavor component, and the cheesy flavor component used in the present invention.

As shown in FIG. 2, the fluid milk concentrate, preferably containing about 1 to about 2 percent salt, is then divided into three portions, each of which is treated (i.e., fermented) with specific enzymes, cultures, adjuncts, and other additives for predetermined time periods sufficient to develop specific flavor characteristics. Specific enzymes, cultures, adjuncts, and other additives are provided from which a "sulfury-cheddar" component, a "creamy-buttery" component, and a "cheesy" component can be produced. Although not shown in FIG. 2, each component stream can be subjected to an optional homogenization step before or after fermentation. After fermentation, each portion is then heated to a temperature and held at that temperature for a time sufficient to inactivate the culture and enzyme systems.

As noted above and shown in FIG. 2, the fluid milk concentrate is divided into three portions, each of which is treated (i.e., fermented) with specific enzymes, cultures, adjuncts, and other additives for a predetermined period of time sufficient to develop specific flavor characteristics. Specific enzymes, cultures, adjuncts, and other additives are provided from which the "sulfury-cheddar" component, the "creamy-buttery" component, and the "cheesy" component can be produced. The processes for preparing these components do not require whey drainage steps. The preparation of each of the flavor components will now be described in detail.

Sulfury-Cheddar Component. The preparation of the sulfury-cheddar component is preferably carried out in a two stage process as illustrated in FIG. 2. In the first stage, a lactic acid culture is added to the milk substrate and are maintained at about 70 to about 90° F. for about 10 to about 24 hours to obtain a pH of about 5.4 or less. Preferably, a lipolytic enzyme and/or a protease enzyme are also added with the lactic acid culture in the first stage; a high proteolytic activity culture (e.g., Micrococcus proteolytic culture) can also be added with the lactic acid culture in the first stage. Then a Brevibacterium culture (preferably a *Brevibacterium linens* culture) or a yeast from the genera Debaromyces or Kluyeromyces and a sulfur-containing substrate, whereby the culture or yeast can convert the sulfur-containing substrate to organoleptically potent sulfur-containing flavor compounds is added and the fermentation continued for about 1 to 10 additional days at a temperature of about 65 to about 86° F. (preferably at about 720° F.). Preferably the Brevibacterium culture is used to form the sulfur-containing compounds. There should not be any heat inactivation of enzymes/cultures between the two fermentation stages. The enzymes can be produced from various microorganisms or extracted from plant or animal tissues. The various enzymes of the enzyme system are available commercially as dry powders or in liquid form. Preferably, both stages are carried out in a single vessel. Preferably, the reaction mixture is subject to aeration during fermentation to prevent anaerobic conditions and to provide good mixing. Generally, conditions should be maintained to minimize phase separation during fermentation. If phase separation does occur, an optional homogenization step can be used after fermentation. After completion of the two fermentation steps or stages, the cultures and enzymes are inactivated by heating to about 145 to about 190° F. for about 16 seconds to about 30 minutes, preferably to about 160° F. for about 16 seconds. If desired, small amounts (i.e., less than about 1 percent) of emulsifying salts (e.g.,tri-sodium citrate, disodium phosphate, and the like) can be added just prior to the inactivation step to help reduce the viscosity. If batch heating is used, the reaction mixture is preferably recirculated during inactivation to improve heat transfer.

As noted, the Brevibacterium culture is preferably used to form the sulfur-containing compounds. If desired, a microorganism genetically modified so as to provide similar Brevibacterium activity can be used in place of the Brevibacterium culture. For purposes of this invention, such a genetically modified microorganism is considered to be included within the term "Brevibacterium culture."

For purposes of this invention, the "sulfur-containing substrates" are sulfur-containing free amino acids, tripeptides containing sulfur-containing amino acids, and protein hydrolystates containing sulfur-containing amino acids. Suitable food protein hydrolysates are available, for example, from Quest International (Hoffman Estates, Illinois) under tradenames N-Z-Amine, N-Z-Case, Hy-Case, and Pepticase, as well as from other suppliers. Preferably, the sulfur-containing substrates includes L-methionine, L-glutathione, and L-cysteine. In especially preferred embodiments, the sulfur-containing substrate is a mixture of L-methionine and L-glutathione, a mixture of L-methionine and L-cysteine, or a mixture of L-methionine, L-glutathione, and L-cysteine. The sulfur-containing substrates are generally added at a level of about 0.01 to about 1 percent.

In a particular preferred embodiment, the sulfury-cheddar component is prepared by treating the milk concentrate (pH about 6.0 to about 6.7) with a lactic acid culture and a lipolytic enzyme in a first stage and then, without any inactivation, further treating with a *Brevibacterium linens* culture with added L-methionine and L-glutathione, added L-methionine and L-cysteine, or added L-methionine, L-glutathione, and L-cysteine. The first stage is carried out for about 10 to about 24 hours at a temperature of about 70 to about 90° F. The second stage is carried out for about 1 to 10 days, preferably for about 4 to about 8 days, at a temperature of about 70 to about 86° F. Although it is preferred that the two stages be carried out sequentially as shown in FIG. 1, they may be combined into a single fermentation step. Such a single stage fermentation process is generally carried out at about 65 to about 86° F. for about 1 to about 10 days.

An especially preferred composition for preparing the sulfury-cheddar component is described in the following Table 2. Example 1 illustrates the preparation of the sulfury-cheddar component using the ingredients and "typical" levels listed in Table 2.

TABLE 2

Especially Preferred Composition for Preparing Sulfury-Cheddar Component

| Ingredient | Range (%) | Typical (%) | Function |
| --- | --- | --- | --- |
| 5X UF/DF Milk | balance | 98.78 | milk substrate |
| First Stage | | | |
| Pregastric esterase | 0–1 | 0.02 | lipolytic enzyme for hydrolysis of fat to free fatty acids |
| Lactococcus lactis and Lactococcus lactis ssp. cremoris | 0.001–2 | 0.01 | starter culture to convert lactose to lactic acid and decrease pH |
| Second Stage | | | |
| Brevibacterium linens | 0.001–2 | 0.01 | flavor adjunct culture to produce sulfur flavor compounds |
| L-methionine | 0.01–1 | 0.1 | amino acid substrate for sulfur compound generation |
| L-glutathione | 0.01–1 | 0.1 | tri-peptide substrate and processing aid to create redox equilibrium conditions for flavor development; hydrolyzed to free amino acids |

Other sulfur-containing substrates, if used, are generally present in a level of about 0.01 to about 1 percent. Fermentation is preferably carried out with aeration to prevent the reaction mixture from becoming anaerobic and to provide good mixing. Aeration is preferably effected using air introduced into the reaction mixture using a diffusion plate or an in-line air sparger. If appropriate (i.e., if phase separation occurs), the reaction mixture can optionally be homogenized prior to further treatment. After fermentation, the cultures and enzymes are inactivated by heating at about 150 to about 185° F. for about 16 seconds to about 30 minutes; preferably, aeration is discontinued throughout the heat inactivation process.

The sulfur-containing substrates are added to assist in the production of sulfur compounds important in cheddar, especially sharp cheddar, flavor development. Preferred sulfur-containing substrates include L-methionine, L-glutathione, L-cysteine, and mixtures thereof. The L-methionine is used for sulfur compound generation through the action of the Brevibacterium culture (preferably a *Brevibacterium linens* culture) or the yeast (preferably from the genera Debaromyces or Kluyeromyces). The tri-peptide L-glutathione (i.e., glutamine-cysteine-glycine) and the amino acid L-cysteine, in addition to serving as substrates, also act as processing aids to create redox equilibrium conditions which facilitate flavor production by the generation of desirable sulfur flavor compounds (i.e., methanethiol, dimethyldisulfide, and dimethyltrisulfide). Hydrolysis of L-glutathione to free amino acids by microbial enzymes is expected during the fermentation period. Further hydrolysis may also occur during subsequent heat treatment (i.e., during inactivation and/or incorporation into cheese base). Generally, expected levels of L-glutathione in the final cheese product (i.e., the flavored cheese product produced with the present cheese flavor system) are less than about 10 ppm.

If desired, sorbic acid can be added to the sulfury-cheddar component to improve its shelf-life characteristics and microorganism stability. Generally such sorbic acid addition can be made at any time after the fermentation process has been successfully initiated. Generally, the amount of sorbic acid added will be in the range of about 0.01 to about 0.5 percent and more preferably in the range of about 0.1 to about 0.2 percent.

The resulting sulfury-cheddar component which is produced is typically a liquid or paste with a moisture content in the range of from about 50 to about 70 percent, preferably from about 53 to about 65 percent. The sulfury-cheddar component can be spray dried to provide a powder with or without the addition of carrier materials, such as whey concentrate or maltodextrins. The sulfury-cheddar component generally has the following flavor characteristics/profile shown in Table 3. The sulfury-cheddar component likely contains other potent aroma or flavor compounds, including sulfur-containing compounds, which have not been detected.

TABLE 3

Typical Flavor Profile for Sulfury-Cheddar Component.

| | Range | Typical |
|---|---|---|
| Methanethiol* | 0.2 M–10 M | 0.5 M |
| Dimethyldisulfide* | 1 M–50 M | 2 M |
| Dimethyltrisulfide* | 1 M–50 M | 1.5 M |
| Acetic acid | 500–1500 ppm | 916 ppm |
| Propionic acid | <25–100 ppm | <25 ppm |
| Butyric acid | 100–500 ppm | 285 ppm |
| Hexanoic acid | 10–200 ppm | 92 ppm |
| Octanoic acid | 10–200 ppm | 45 ppm |
| Decanoic acid | 10–200 ppm | 64 ppm |
| Dodecanoic acid | 10–200 ppm | 82 ppm |

*Sulfur compounds are reported in peak value areas as determined using gas chromatography; M = million. The initial peak value areas for these sulfur compounds was essentially zero.

Creamy-Buttery Component. The preparation of the creamy-buttery component is preferably carried out in a two stage process as illustrated in FIG. 2. The preparation of the creamy-buttery component is carried out by adding a lactic acid culture to the milk concentrate and then fermenting the mixture at about 70 to 90° F. for about 10 to about 24 hours. Preferably, a lipolytic enzyme is also added to the milk concentrate along with the lactic acid culture. A diacetyl-producing flavor culture and sodium citrate are then added and the fermentation continued at about 70 to about 900F, preferably about 86° F., for about 1 to about 10 days, preferably about 3 to about 8 days. The enzymes can be produced from various microorganisms or extracted from plant or animal tissues. The various enzymes of the enzyme system are available commercially as dry powders or in liquid form. Preferably, the reaction mixture is subject to aeration during fermentation to prevent anaerobic conditions and to provide good mixing. Phase separation is not a significant problem during fermentation. After completion of the fermentation step, the cultures and enzymes are inactivated by heating to about 145 to about 190° F. for about 16 seconds to about 30 minutes, preferably to about 160° F. for about 16 seconds.

In a particular preferred embodiment, the creamy-buttery component is prepared by treating the milk concentrate (pH about 6.0 to about 6.7) with a lactic acid culture and a pregastric esterase in a first stage and then, without any inactivation, adding sodium citrate (generally about 0.05 to about 5 percent) and further treating with one or more cultures which have the ability to produce diacetyl from citrate. Preferred diacetyl-producing cultures include Leuconostoc and *Lactococcus lactis* ssp. *lactis* biovar. *diacetylactis*. The first stage fermentation is carried out for about 10 to about 24 hours at a temperature of about 70 to about 90° F. The second stage is carried out for about 1 to about 10 days at a temperature of about 70 to about 90° F.

Although FIG. 2 illustrates the two stages being carried out sequentially. They may, however, be combined into a single fermentation step. Such a single stage fermentation process is generally carried out at a temperature of about 70 to 90° F. for about 1 to about 10 days wherein aeration is used to control the culture activity. In such a one-stage process, the lactic acid culture, the diacety-producing culture, the lipase enzyme, and sodium citrate are generally added together on the first day without aeration. On the second day, sodium hydroxide is added to keep the pH from dropping below about 5.2; generally, sorbic acid, if desired, is also added on the second day at a level of about 0.1 percent. Aeration is begun on the second day and continued throughout the fermentation. After completion of the fermentation, sorbic acid, again if desired, can be added at a level of about 0.1 percent. The fermentation mixture is then heat-inactivated, placed in appropriate containers, cooled, and then stored until used. If desired, small amounts (i.e., less than about 1 percent) of emulsifying salts (e.g., tri-sodium citrate, disodium phosphate, and the like) can be added just prior to the inactivation step to help reduce the viscosity.

As noted, the Leuconostoc and *Lactococcus lactis* ssp. *lactis* biovar. *diacetylactis* cultures are the preferred diacetyl-producing flavor cultures. If desired, a microorganism genetically modified so as to provide similar activity can be used in place of the Leuconostoc and/or *Lactococcus lactis* ssp. *lactis* biovar. *diacetylactis* cultures. For purposes of this invention, such a genetically modified microorganism is considered to be included within the term "diacetyl-producing flavor cultures."

An especially preferred composition for preparing the creamy-buttery component is described in the following Table 4. Example 2 illustrates the preparation of the creamy-buttery component using the ingredients and "typical" levels listed in Table 2.

TABLE 4

Especially Preferred Composition for Preparing Creamy-Buttery Component

| Ingredient | Range (%) | Typical (%) | Function |
|---|---|---|---|
| 5X UF/DF Milk | balance | 99.83 | milk substrate |
| First Stage | | | |
| Pregastric esterase | 0–1 | 0.02 | lipolytic enzyme for hydrolysis of fat to free fatty acids |
| *Lactococcus lactis* and *Lactococcus lactis* ssp. *cremoris* | 0.001–2 | 0.01 | starter culture to convert lactose to lactic acid and decrease pH |
| Second Stage | | | |
| Sodium Citrate | 0.01–10 | 0.3 | substrate for diacetyl production and flavor generation |

TABLE 4-continued

Especially Preferred Composition for Preparing Creamy-Buttery Component

| Ingredient | Range (%) | Typical (%) | Function |
|---|---|---|---|
| Leuconostoc | 0–1 | 0.0001 | flavor adjunct culture for production of diacetyl from citrate |
| *Lactococcus lactis* ssp. *lactis* biovar. *diacetylactis* | 0–1 | 0.0001 | flavor adjunct culture for production of diacetyl from citrate |

After fermentation, the cultures and enzymes are inactivated by heating at about 145 to about 190° F. for about 16 seconds to about 30 minutes, preferably to about 160° F. for about 16 seconds. Preferably, aeration is not used during or after the heat inactivation process.

If desired, sorbic acid can be added to the creamy-buttery component to improve its shelf-life characteristics and microorganism stability. Generally such sorbic acid addition can be made at any time after the fermentation process has been successfully initiated. Generally, the amount of sorbic acid added will be in the range of about 0.01 to about 0.5 percent and more preferably in the range of about 0.1 to about 0.2 percent.

The resulting creamy-buttery component which is produced is typically a liquid or paste with a moisture content in the range of from about 50 to about 70 percent, preferably from about 53 to about 65 percent. The creamy-buttery component can be spray dried to provide a powder with or without the addition of carrier materials, such as whey concentrate or maltodextrins. The creamy-buttery component generally has the flavor characteristics/profile shown in Table 5. The creamy-buttery component likely contains other potent aroma or flavor compounds which have not been detected.

TABLE 5

Typical Flavor Profile for Creamy-Buttery Component.

| | Range (ppm) | Typical (ppm) |
|---|---|---|
| Ethanol | 1–150 | 41 |
| Acetone | 1–5 | 2 |
| Diacetyl | 20–400 | 176 |
| Acetic acid | 400–1000 | 660 |
| Propionic acid | <25–100 | <25 |
| Butyric acid | 200–500 | 275 |
| Hexanoic acid | 20–150 | 86 |
| Octanoic acid | 10–100 | 30 |
| Decanoic acid | 50–150 | 86 |
| Dodecanoic acid | 50–150 | 106 |

Cheesy Component. The cheesy component can generally be prepared using the starting materials and procedures described in co-pending U.S. patent application Ser. No. 09/141,082, filed on Aug. 27, 1998, now abandoned, which is hereby incorporated by reference. The enzyme system used to prepare the cheesy component includes a lipase, a protease, and a peptidase. The substrate is treated with the enzyme system at a temperature of from about 60 to about 140° F. for a period of from about 0.5 to about 10 days, preferably from about 1 to about 3 days, to reach the desired cheesy flavor level. The enzymes can be produced from various microorganisms or extracted from plant or animal tissues. The various enzymes of the enzyme system are available commercially as dry powders or in liquid form.

Lipase (sometimes referred to as an esterase) is an enzyme which is well known in the art. Lipase are typically derived from the gullet tissues of young animals (calves, kids, or lambs), from the pancreas of adult animals, or from microbial sources. Various commercial preparations derived from gullet tissue are available from Degussa, Rhodia, or other such companies under various trade names. The enzyme can be manufactured by grinding edible gullet with salt and non-fat dry milk, drying the mixture, and grinding again. Microbial sources of lipase are, for example, the molds *Candida cylindracea* Type VIII, *Aspergilus oryzae, A. niger, Pencillium roqueforti, P. glaucum,* and *Rhizopus oryzae*.

In preparing the cheesy component, a powdered lipase (preferably a fungal lipase) is generally used at a level of about 0.05 to about 0.4 percent. A suitable fungal lipase is commercially available from Biocatalysts under the tradename Lipomod 187.

Proteases are enzymes which can be derived from fungal, plant, or animal sources, as is well-known in the art. Examples of suitable proteases include Enzeco Neutral Bacterial Protease 2X available from Enzyme Development Corp. and Promod 215 available from Biocatalyst. The powdered proteases are generally used at levels of from about 0.01 to about 1 percent, preferably at levels of from 0.1 to about 0.4 percent.

An enzyme with peptidase activity, preferably amino peptidase activity, is used in the enzyme system; such enzymes act upon bitter flavored peptides that result from protein hydrolysis. The peptidase enzyme in concert with the protease enzyme creates a high concentration of free amino acids and small peptides which contribute to the cheese flavor. The peptidase can be a purified enzyme material or can be cells of a microbe which produces peptidase activity, such as *Lactobacillus helveticus*. The culture cells can be spray dried, freeze dried, frozen, or freshly cultured cells and can be non-growing or incapable of propagation within the substrate. Spray dried *Lactobacillus helveticus* cells are used at a level of from about 0.01 to about 3 percent, preferably from about 0.05 to about 0.30 percent. The preferred enzymes are powders. However, suitable liquid forms of these enzymes would be acceptable for use in this invention.

The substrate is treated with the enzyme system for a period of from about 0.5 to about 10 days, preferably from about 1 to about 3 days, to reach the desired cheesy flavor level. The treatment is conducted at a temperature of from about 60 to about 140° F. The desired flavor level can be judged organoleptically and can be estimated through analytical measurements, such as pH, titratable acidity, and concentration of free fatty acids and amino acids. When the target flavor is reached, the enzymes are deactivated by heating the mixture to a temperature of from about 160 to about 210° F. and holding the substrate at the elevated temperature for a sufficient time to insure complete enzyme deactivation (e.g., from about 5 to about 60 minutes). If desired, small amounts (i.e., less than about 1 percent) of emulsifying salts (e.g.,tri-sodium citrate, disodium phosphate, and the like) can be added just prior to the inactivation step to help reduce the viscosity. The cheesy component is then cooled to about 40 to about 75° F. Stabilizing agents, such as gums or proteins, may be added during or prior to cooling if desired.

The enzymes may be added sequentially or all at once to provide desired flavor profile. In the sequential addition of the enzymes, one or more of the enzymes is added and a treatment period of from about 4 hours to about 5 days is conducted. The remaining enzymes are then added and the treatment continues for further predetermined time of from about 0.5 to about 5 days. There is no inactivation step between the sequential addition of the enzymes.

In another embodiment of the invention, a first enzyme treatment takes place at a relatively high temperature of from about 120 to about 140° F. At least one of the enzymes is added and is incubated at this temperature for a first treatment of from about 2 to about 6 hours. The remaining enzymes are then added for a second treatment period of from about 6 hours to about 10 days which takes place at a temperature of from about 60 to about 140° F.

The process can be, and preferably is, conducted in a single vessel without transfer to additional vessels for sequential steps. The vessel is preferentially provided with mixing equipment to insure good contact between the enzymes and the substrate materials and to maintain the solids in suspension. A scraped surface mixing tank is preferred. A recirculation and homogenization device may be employed to prevent segregation of a fat phase from aqueous materials and to aid in maintaining the solids in suspension. Water may be added during the fermentation to maintain desired moisture content and acidic or basic materials may be added to adjust the pH.

In a particular preferred embodiment, the cheesy component is prepared by treating the milk concentrate (pH about 6.0 to about 6.7) with added disodium phosphate with a neutral bacterial protease, an enzyme with aminopeptidase acitvity, a fungal protease, and a fungal lipase for about two days at a temperature of about 100 to about 110° F. as shown in FIG. 1.

An especially preferred composition for preparing the cheesy component is described in the following Table 6. Example 3 illustrates the preparation of the cheesy component using the ingredients and "typical" levels listed in Table 2.

TABLE 6

Especially Preferred Composition for Preparing Cheesy Component

| Ingredient | Range (%) | Typical (%) | Function |
| --- | --- | --- | --- |
| 5X UF/DF Milk | balance | 98.1 | milk substrate |
| Monosodium or Disodium Phosphate | 0.1–3 | 1.0 | emulsifier to aid in maintaining solids in suspension |
| Neutral bacterial protease (Enzeco Neutral Bacterial Protease 2X, Enzyme Development Corp.) | 0.01–1 | 0.15 | neutral bacterial protease for hydrolysis of milk proteins to polypeptides, peptides, and amino acids for flavor generation |
| Lactobacillus helveticus (EnzoBact, Medipharm) | 0.01–3 | 0.14 | debittering agent; aminopeptidase activity |
| Fungal Protease (Promod 215, Biocatalysts) | 0.01–1 | 0.28 | proteolytic enzyme for hydrolysis of milk proteins to polypeptides, peptides, and amino acids for flavor generation |
| Fungal Lipase | 0.01–1 | 0.12 | lipase enzyme for hydrolysis of fat to free fatty acids and |
| (Lipomod 187, Biocatalysts) | | | development of lipolytic flavor notes |
| Sorbic Acid | 0.01–0.5 | 0.2 | mold inhibitor |

Fermentation is preferably carried out with recirculation using a shear pump to provide good mixing and fat emulsification. After fermentation, the enzymes are inactivated by applying heat (generally about 185° F. for about 30 minutes); preferably, recirculation is continued throughout the heat inactivation process but without using the shear pump. The preferred cheesy component prepared with the ingredients in the above Table generally has improved flavor characteristics (i.e., a stronger cheesy "bite") than similar components prepared using the specific starting materials and procedures described in co-pending U.S. patent application Ser. No. 09/141,082 now abandoned.

As indicated in the table above, sorbic acid can be added to the cheesy component to improve its shelf-life characteristics and microorganism stability. Generally such sorbic acid addition can be made at any time after the fermentation process has been successfully initiated. Generally, the amount of sorbic acid added will be in the range of about 0.01 to about 0.5 percent and more preferably in the range of about 0.1 to about 0.2 percent.

The resulting cheesy component which is produced is typically a liquid or paste with a moisture content in the range of from about 50 to about 70 percent, preferably from about 53 to about 65 percent. The cheesy component can be spray dried to provide a powder with or without the addition of carrier materials, such as whey concentrate or maltodextrins. The cheesy component generally has the flavor characteristics/profile shown in Table 7. The cheesy component likely contains other potent aroma or flavor compounds which have not been detected.

TABLE 7

Typical Flavor Profile for Cheesy Component.

| | Range | Typical |
| --- | --- | --- |
| Gel Electrophoresis Profile | 9–34 k (100%) | 9–11 k (100%) |
| Protease activity | 4–25 Fl. intensity units/min/g | 9.66 Fl. intensity units/min/g |
| Acetic acid | 10–100 ppm | 35 ppm |
| Propionic acid | <25 ppm–100 | <100 ppm |
| Butyric acid | 2000–7000 ppm | 5823 ppm |
| Hexanoic acid | 1000–6000 ppm | 3254 ppm |
| Octanoic acid | 1000–4000 ppm | 2922 ppm |
| Decanoic acid | 4000–10000 ppm | 6230 ppm |
| Dodecanoic acid | 4000–10000 ppm | 7145 ppm |

The following examples further illustrate various features of the invention, but are not intended to limit the scope of the invention as set forth in the appended claims. Examples 1–3 illustrate the preparation of the flavor components used in the present invention. Examples 4–7 illustrates the production of flavored cheeses using the flavored components in the process of the present invention. Unless otherwise noted, all percentages and ratios are by weight. All reference cited in the present specification are hereby incorporated by reference.

EXAMPLE 1

This example illustrates the preparation of the sulfury-cheddar component. Fresh whole milk was combined with fresh cream in an amount sufficient to obtain a standardized milk with a fat content of about 54 percent based on dry matter. The standarized milk was pasteurized in a high temperature heat exchanger (HTST) at 164° F. for 16 seconds and then cooled to 130° F. The cooled milk was then concentrated to 5× in a spiral wound ultrafiltration (UF) system with difiltration (DF) to reduce the lactose content to about 1 percent. The UF/DF milk (4222 pounds), with 2 percent added salt, was heat treated at 155° F. for 10 minutes in a agitated, jacketed vessel and then cooled to 78° F. The milk concentrate contained 41.8 percent solids, 22.6 percent fat, and 15.4 percent protein and had a pH of 6.4.

Lactic acid starter culture (0.01 percent; *Lactococcus lactis* and *Lactococcus lactis* ssp. *cremoris;* R603 from Chr. Hansens, Inc.), Micrococcus (0.001 percent), and pregastric esterase (0.02 percent) were added to the milk concentrate and fermented in a first stage for 17 hours at 75° F. to reach a pH of 5.16. L-methionine (0.1 percent), L-glutathione (0.1 percent), and an activated culture of *Brevibacterium linens* (1 percent) were added to the first stage fermentation product to initiate the second stage of the fermentation process. Prior to its use, the *Brevibacterium linens* culture was activated under aerobic conditions for 48 hours at 75° F. in tryptic soy broth (TSB). The second stage fermentation was continued for an additional 7 days with aeration at a temperature of 72° F.; the pH at the end of the second stage was 6.75. The level of sulfur compounds (i.e., methanethiol, dimethyldisulfide, and dimethyltrisulfide) increased dramatically during the fermentation process (see results in Table 3). The resulting sulfury-cheddar component was heated to 155° F. for ten minutes in order to inactivate the cultures and enzymes and to extend the shelf life of the product. A relatively small loss of sulfur compounds was observed in the deactivation step. The flavor profile for the resulting sulfury-cheddar component is in Table 3 above under the heading "Typical." The sulfury-cheddar component had a total solids of about 41 percent and could, if desired, be spray dried to form a sulfury-cheddar flavor powder.

EXAMPLE 2

This example illustrates the preparation of the creamy-buttery component. A milk concentrate similar to the one prepared in Example 1 was used as the starting substrate.

Lactic acid starter culture (0.01 percent; *Lactococcus lactis* and *Lactococcus lactis* ssp. *cremoris;* R603 from Chr. Hansens, Inc.)and pregastric esterase (0.02 percent) were added to the milk concentrate and fermented in a first stage for 17 hours at 75° F. to reach a pH of 5.16. After heating to 82° F., sodium citrate (0.2 percent) and activated cultures of Leuconostoc (0.1 percent) and *Lactococcus lactis* ssp. *lactis* biovar. *diacetylactic* (0.1 percent) were added to the first stage fermentation product to initiate the second stage of the fermentation process. Prior to their use, the Leuconostoc and *Lactococcus lactis* ssp. *lactis* biovar. *diacetylactic* cultures were activated overnight at 75° F. in MRS broth. The second stage fermentation was continued for an additional 6 days with aeration at a temperature of 82° F.; the pH at the end of the second stage was 5.26. The diacetyl level increased from an initial value of about 1 ppm to about 176 ppm at the end of the second stage. The resulting creamy-buttery component was heated to 155° F. for ten minutes in order to inactivate the cultures and enzymes and to extend the shelf life of the product. A relatively small loss of diacetyl was observed in the deactivation step. The flavor profile for the resulting creamy-buttery component is in Table 5 above under the heading "Typical." The creamy-buttery component had a total solids of about 42 percent and could, if desired, be spray dried to form a creamy-buttery flavor powder.

EXAMPLE 3

This example illustrates the preparation of the cheesy component. A milk concentrate was prepared using milk protein concentrate (MPC) powder, water, anhydrous milk fat, and salt.

MPC powder and salt were hydrated with warm water in a Vacuum-Cam Injection mixer to form a protein slurry. The protein slurry was transferred to an agitated jacketed vessel with continuous recirculation using a shear pump. Melted anhydrous milkfat was then added and recirculated through the shear pump to form the milk concentrate. The resulting milk concentrate contained 43.5 percent solids, 18.6 percent fat, 13.7 percent protein, 2.8 percent lactose, and 1.85 percent salt.

The milk concentrate was maintained in the same agitated jacketed vessel with continuous recirculation using a shear pump during the fermentation process. Monosodium phosphate (0.5 percent) was added and the slurry was heated at 162° F. for 15 minutes. After cooling to 104° F., an enzyme slurry containing neutral bacterial protease (about 0.18 percent; Enzeco Neutral Bacterial Protease 2X, Enzyme Development Corp.), *Lactobacillus helveticus* (about 0.14 percent; EnzoBact, Medipharm), fungal protease (about 0.28 percent; Promod 215, Biocatalysts), and fungal lipase (about 0.28 percent; Lipomod 187, Biocatalysts); percentages are based on the total weight of the fermentation mixture. Fermentation was continued for 48 hours at 104° F. with continuous agitation and recirculation using the shear pump to maintain an emulsion. After completion of the fermentation, the enzymes were inactivated by heating to 185° F. for 30 minutes. The flavor profile for the resulting cheesy component is in Table 7 above under the heading "Typical." Sorbic acid (about 0.2 percent) was then added. The cheesy component had a total solids of about 43 percent and could, if desired, be spray dried to form a cheesy flavor powder.

EXAMPLE 4

This example illustrates the preparation of a mild flavored cheese without curing using a single flavor component. A creamy-buttery concentrate (as prepared in Example 2) was removed from refrigerated shortage and then heated from about 45° F. to about 90° F. A non-coagulating amount of cheese coagulant (Marzyme Supreme from Rhodia Inc., Madison. Wis.) was added immediately prior to evaporation. A Turba-Film swept surface vacuum evaporator (LCI Corporation, Charlotte, N.C.) operated at about 70° F. and about 18 torr was used to remove moisture from the concentrate. The total solids increased from about 42.6 percent to about 59.1 percent. The flavor profile of the resulting cheese was altered slightly from the profile shown in Table 5 as shown in the table below.

| Flavor Compound | Concentration (ppm) |
| --- | --- |
| Diacetyl | 144 |
| Propionic acid | <25 |
| Butyric acid | 352 |
| Hexanoic acid | 123 |
| Octanoic acid | 45 |
| Decanoic acid | 117 |
| Dodecanoic acid | 140 |

As compared to Table 5, the diacetyl decrease slightly while the free fatty acids increased slightly. The resulting cheese has a mild pleasing flavor similar to a mild cheddar or mozzarella cheese and required no curing for flavor development.

EXAMPLE 5

This example illustrate the preparation of a medium flavored cheddar cheese without curing using a single flavor component. A sulfury-cheddar concentrate (as prepared in Example 1) was removed from refrigerated shortage and then heated from about 45° F. to about 78° F. A non-coagulating amount of cheese coagulant (Marzyme Supreme from Rhodia Inc., Madison. Wis.) was added immediately prior to evaporation. A Turba-Film swept surface vacuum evaporator (LCI Corporation, Charlotte, N.C.) operated at about 68° F. and about 16 torr was used to remove moisture from the concentrate. The total solids increased from about 44.1 percent to about 60.2 percent. The flavor profile of the resulting cheese was altered slightly from the profile shown in Table 3 in that the free fatty acids increased slightly. The resulting cheese had a flavor profile similar to a medium cheddar cheese from the eastern United States.

EXAMPLE 6

This example illustrate the preparation of a sharp flavored cheddar cheese without curing using all three flavor components. The sulfury-cheddar component (as prepared in Example 1), the creamy-buttery component (as prepared in Example 2), and the cheesy component (as prepared in Example 3) were removed from refrigerated shortage and then heated from about 45° F. to about 78° F. The three components were mixed in a tank at a ratio of 3 parts sulfury-cheddar component, 2 parts creamy-buttery component, and 2 parts cheesy component. A non-coagulating amount of cheese coagulant (Marzyme Supreme from Rhodia Inc., Madison. Wis.) was added immediately prior to evaporation. A Turba-Film swept surface vacuum evaporator (LCI Corporation, Charlotte, N.C.) operated at about 79° F. and about 16 torr was used to remove moisture from the concentrate. The total solids increased from about 37.4 percent to about 62.1 percent. The flavor profile of the resulting cheese, as shown in the following table, was altered slightly from the profile shown in Table 3 in that the free fatty acids increased slightly; there was no loss of sulfur compounds. The resulting cheese had a flavor profile similar to a extra sharp cheddar cheese and was suitable for use in a highly flavored process cheese.

| Flavor Compound | Concentration (ppm) |
| --- | --- |
| Diacetyl | 45 |
| Propionic acid | 73 |
| Butyric acid | 1823 |
| Hexanoic acid | 1102 |
| Octanoic acid | 707 |
| Decanoic acid | 1561 |
| Dodecanoic acid | 1797 |

What is claimed is:

1. A process for making a flavored cheese, said process comprising:
   (1) forming a first concentrate mixture containing one, two, or three cheese-flavor concentrates selected from the group consisting of a sulfur-cheddar concentrate, a creamy-buttery concentrate, and a cheesy concentrate and wherein the cheese-flavor concentrate or concentrates in the first concentrate mixture are selected to achieve a desired flavor profile in the flavored cheese;
   (2) combining a cheese coagulant in a non-coagulating amount with the first concentrate mixture to provide a second concentrate mixture; and
   (3) removing moisture from the second concentrate mixture to a solids level of less than about 75 percent to form the flavored cheese,
   wherein the flavored cheese does not require curing;
   wherein the sulfur-cheddar concentrate is obtained by treating a first milk concentrate with a lactic acid culture at a temperature of about 70 to about 90° F. for about 10 to about 24 hours to obtain first mixture having a pH of about 5.4 or less, adding a sulfur-containing substrate to the first mixture to form a second mixture, treating the second mixture with a Brevibacterium culture or a yeast from the genera Debaromyces or Kluyeromyces, whereby the Brevibacterium culture or the yeast converts the sulfur-containing substrate to sulfur-containing flavor compounds, at a temperature of about 65 to about 86° F. for about 1 to about 10 days to form a third mixture, and treating the third mixture at a temperature sufficient to inactivate the cultures and enzymes in the third mixture to form the sulfury-cheddar flavor component;
   wherein the creamy-buttery concentrate is obtained by treating a second milk concentrate with a lactic acid culture at a temperature of about 70 to about 90° F. for about 10 to about 24 hours to form a fourth mixture, adding sodium citrate to the fourth mixture to form a fifth mixture, treating the fifth mixture with a diacetyl-producing flavor culture at about 70 to about 90° F. for about 1 to about 10 days to form a sixth mixture, and treating the sixth mixture at a temperature sufficient to inactivate the cultures and enzymes in the sixth mixture to form the creamy-buttery flavor component; and
   wherein the cheesy concentrate is obtained by treating a third milk concentrate with a lipase, a protease, and a peptidase at a temperature of about 60 to about 140° F. for about 0.5 to about 10 days to form a seventh mixture and treating the seventh mixture at a temperature sufficient to inactivate enzymes in the seventh mixture to form the cheesy flavor component.

2. The process as described in claim 1, wherein the non-coagulating amount is zero.

3. The process as described in claim 1, where the non-coagulating amount is greater than zero.

4. The process as described in claim 1, wherein the first concentrate mixture contains two or three of the cheese-favor concentrates.

5. The process as described in claim 1, wherein the moisture is removed from the second concentrate mixture using evaporation.

6. The process as described in claim 4, wherein the moisture is removed from the second concentrate mixture using evaporation.

7. The process as described in claim 5, wherein the evaporation is carried out at a temperature of about 60 to 140° F. and a vacuum of about 10 to about 150 torr.

8. The process as described in claim 6, wherein the evaporation is carried out at a temperature of about 60 to 140° F. and a vacuum of about 10 to about 150 torr.

9. The process as described in claim 7, wherein the temperature for evaporation is about 68 to about 90° F.

10. The process as described in claim 8, wherein the temperature for evaporation is about 68 to about 90° F.

11. The process as described in claim 5, wherein the first milk concentrate is also treated with a lipolytic enzyme, wherein the second milk concentrate is also treated with a lipolytic enzyme, and wherein the Brevibacterium culture is used to prepare the sulfury-cheddar flavor component.

12. The process as described in claim 6, wherein the first milk concentrate is also treated with a lipolytic enzyme, wherein the second milk concentrate is also treated with a lipolytic enzyme, and wherein the Brevibacterium culture is used to prepare the sulfury-cheddar flavor component.

13. The process as described in claim 11, wherein the first milk concentrate is also treated a high proteolytic activity culture.

14. The process as described in claim 12, wherein the first milk concentrate is also treated a high proteolytic activity culture.

15. The process as described in claim 11, wherein the sulfur-containing substrate is L-methionine, L-glutathione, L-cysteine, or mixtures thereof.

16. The process as described in claim 12, wherein the sulfur-containing substrate is L-methionine, L-glutathione, L-cysteine, or mixtures thereof.

17. The process as described in claim 15, wherein the first milk concentrate, the second milk concentrate, and the third milk concentrate are prepared by an ultrafiltration/diafiltration process, and wherein the first milk concentrate, the second milk concentrate, and the third milk concentrate independently have total solid levels of about 30 to about 50 percent, moisture levels of about 50 to about 70 percent, fat levels of about 15 to about 27 percent, protein levels of about 10 to about 20 percent, lactose levels of about 0.5 to about 2 percent, and salt levels of about 1 to about 4 percent.

18. The process as described in claim 16, wherein the first milk concentrate, the second milk concentrate, and the third milk concentrate are prepared by an ultrafiltration/diafiltration process, and wherein the first milk concentrate, the second milk concentrate, and the third milk concentrate independently have total solid levels of about 30 to about 50 percent, moisture levels of about 50 to about 70 percent, fat levels of about 15 to about 27 percent, protein levels of about 10 to about 20 percent, lactose levels of about 0.5 to about 2 percent, and salt levels of about 1 to about 4 percent.

19. The process as described in claim 17,
wherein the lactic acid culture used to prepare the sulfury-cheddar flavor component is *Lactococcus lactis* and *Lactococcus lactis* ssp. *cremoris* and the lipolytic enzyme used to prepare the sulfury-cheddar flavor component is pregastric esterase;
wherein the lactic acid culture used to prepare the creamy-buttery flavor component is *Lactococcus lactis, Lactococcus lactis* ssp. *cremoris,* or mixtures thereof, the lipolytic enzyme used to prepare the creamy-buttery flavor component is pregastric esterase, and the diacetyl-producing flavor culture used to prepare the creamy-buttery flavor component is Leuconostoc, *Lactoccocus lactis* ssp. *lactis* biovar. *diaetylactis*, or mixtures thereof; and
wherein the lipase used to prepare the cheesy flavor component is a fungal lipase, the protease used to prepare the cheesy flavor component is a neutral bacterial protease, a fungal protease, or mixtures thereof, and the peptidase used to prepare the cheesy flavor component is from *Lactobacillus helveticus*.

20. The process as described in claim 18,
wherein the lactic acid culture used to prepare the sulfury-cheddar flavor component is *Lactococcus lactis* and *Lactococcus lactis* ssp. *cremoris* and the lipolytic enzyme used to prepare the sulfury-cheddar flavor component is pregastric esterase;
wherein the lactic acid culture used to prepare the creamy-buttery flavor component is *Lactococcus lactis, Lactococcus lactis* ssp. *cremoris,* or mixtures thereof, the lipolytic enzyme used to prepare the creamy-buttery flavor component is pregastric esterase, and the diacetyl-producing flavor culture used to prepare the creamy-buttery flavor component is Leuconostoc, *Lactoccocus lactis* ssp. *lactis* biovar. *diaetylactis,* or mixtures thereof; and
wherein the lipase used to prepare the cheesy flavor component is a fungal lipase, the protease used to prepare the cheesy flavor component is a neutral bacterial protease, a fungal protease, or mixtures thereof, and the peptidase used to prepare the cheesy flavor component is from *Lactobacillus helveticus*.

21. The process as described in claim 19, wherein the first milk concentrate is also treated a high proteolytic activity culture and wherein the high proteolytic activity culture used to prepare the sulfury-cheddar flavor component is a Micrococcus.

22. The process as described in claim 20, wherein the first milk concentrate is also treated a high proteolytic activity culture and wherein the high proteolytic activity culture used to prepare the sulfury-cheddar flavor component is a Micrococcus.

23. A process for making a flavored cheese, said process comprising:
(1) forming a first concentrate mixture consisting essentially of one, two, or three cheese-favor concentrates selected from the group consisting of a sulfur-cheddar concentrate, a creamy-buttery concentrate, and a cheesy concentrate and wherein the cheese-flavor concentrate or concentrates in the first concentrate mixture are selected to achieve a desired flavor profile in the flavored cheese;
(2) combining a cheese coagulant in a non-coagulating amount with the first concentrate mixture to provide a second concentrate mixture; and
(3) evaporating moisture from the second concentrate mixture to a solids level of less than about 75 percent to form the flavored cheese,
wherein the flavored cheese does not require curing;
wherein the sulfur-cheddar concentrate is obtained by treating a first milk concentrate with a lactic acid culture at a temperature of about 70 to about 90° F. for about 10 to about 24 hours to obtain first mixture having a pH of about 5.4 or less, adding a sulfur-containing substrate to the first mixture to form a second mixture, treating the second mixture with a Brevibacterium culture or a yeast from the genera Debaromyces or Kluyeromyces, whereby the Brevibacterium culture or the yeast converts the sulfur-containing substrate to sulfur-containing flavor compounds, at a temperature of about 65 to about 86° F. for about 1 to about 10 days to form a third mixture, and treating the third mixture at a temperature sufficient to inactivate the cultures and enzymes in the third mixture to form the sulfury-cheddar flavor component;
wherein the creamy-buttery concentrate is obtained by treating a second milk concentrate with a lactic acid culture at a temperature of about 70 to about 90° F. for about 10 to about 24 hours to form a fourth mixture, adding sodium citrate to the fourth mixture to form a fifth mixture, treating the fifth mixture with a diacetyl-producing flavor culture at about 70 to about 90° F. for about 1 to about 10 days to form a sixth mixture, and treating the sixth mixture at a temperature sufficient to inactivate the cultures and enzymes in the sixth mixture to form the creamy-buttery flavor component; and
wherein the cheesy concentrate is obtained by treating a third milk concentrate with a lipase, a protease, and a peptidase at a temperature of about 60 to about 140° F. for about 0.5 to about 10 days to form a seventh mixture and treating the seventh mixture at a temperature sufficient to inactivate enzymes in the seventh mixture to form the cheesy flavor component.

24. The process as described in claim 23, wherein the non-coagulating amount is zero.

25. The process as described in claim 23, wherein the non-coagulating amount is greater than zero.

26. The process as described in claim 23, wherein the evaporation is carried out at a temperature of about 60 to 140° F. and a vacuum of about 10 to about 150 torr.

27. The process as described in claim 26, wherein the temperature for evaporation is about 68 to about 90° F.

28. The process as described in claim 23, wherein the first milk concentrate is also treated with a lipolytic enzyme, wherein the second milk concentrate is also treated with a lipolytic enzyme, and wherein the Brevibacterium culture is used to prepare the sulfury-cheddar flavor component.

29. The process as described in claim 26, wherein the first milk concentrate is also treated with a lipolytic enzyme, wherein the second milk concentrate is also treated with a lipolytic enzyme, and wherein the Brevibacterium culture is used to prepare the sulfury-cheddar flavor component.

30. The process as described in claim 28, wherein the first milk concentrate is also treated with a high proteolytic activity culture.

31. The process as described in claim 29, wherein the first milk concentrate is also treated with a high proteolytic activity culture.

32. The process as described in claim 28, wherein the sulfur-containing substrate is L-methionine, L-glutathione, L-cysteine, or mixtures thereof.

33. The process as described in claim 29, wherein the sulfur-containing substrate is L-methionine, L-glutathione, L-cysteine, or mixtures thereof.

34. The process as described in claim 32, wherein the first milk concentrate, the second milk concentrate, and the third milk concentrate are prepared by an ultrafiltration/diafiltration process, and wherein the first milk concentrate, the second milk concentrate, and the third milk concentrate independently have total solid levels of about 30 to about 50 percent, moisture levels of about 50 to about 70 percent, fat levels of about 15 to about 27 percent, protein levels of about 10 to about 20 percent, lactose levels of about 0.5 to about 2 percent, and salt levels of about 1 to about 4 percent.

35. The process as described in claim 33, wherein the first milk concentrate, the second milk concentrate, and the third milk concentrate are prepared by an ultrafiltration/diafiltration process, and wherein the first milk concentrate, the second milk concentrate, and the third milk concentrate independently have total solid levels of about 30 to about 50 percent, moisture levels of about 50 to about 70 percent, fat levels of about 15 to about 27 percent, protein levels of about 10 to about 20 percent, lactose levels of about 0.5 to about 2 percent, and salt levels of about 1 to about 4 percent.

36. The process as described in claim 34,
wherein the lactic acid culture used to prepare the sulfury-cheddar flavor component is *Lactococcus lactis* and *Lactococcus lactis* ssp. *cremoris* and the lipolytic enzyme used to prepare the sulfury-cheddar flavor component is pregastric esterase;
wherein the lactic acid culture used to prepare the creamy-buttery flavor component is *Lactococcus lactis, Lactococcus lactis* ssp. *cremoris,* or mixtures thereof, the lipolytic enzyme used to prepare the creamy-buttery flavor component is pregastric esterase, and the diacetyl-producing flavor culture used to prepare the creamy-buttery flavor component is Leuconostoc, *Lactoccocus lactis* ssp. *lactis* biovar. *diaetylactis,* or mixtures thereof; and
wherein the lipase used to prepare the cheesy flavor component is a fungal lipase, the protease used to prepare the cheesy flavor component is a neutral bacterial protease, a fungal protease, or mixtures thereof, and the peptidase used to prepare the cheesy flavor component is from *Lactobacillus helveticus.*

37. The process as described in claim 35,
wherein the lactic acid culture used to prepare the sulfury-cheddar flavor component is *Lactococcus lactis* and *Lactococcus lactis* ssp. *cremoris* and the lipolytic enzyme used to prepare the sulfury-cheddar flavor component is pregastric esterase;
wherein the lactic acid culture used to prepare the creamy-buttery flavor component is *Lactococcus lactis, Lactococcus lactis* ssp. *cremoris,* or mixtures thereof, the lipolytic enzyme used to prepare the creamy-buttery flavor component is pregastric esterase, and the diacetyl-producing flavor culture used to prepare the creamy-buttery flavor component is Leuconostoc, *Lactoccocus lactis* ssp. *lactis* biovar. *diaetylactis,* or mixtures thereof; and
wherein the lipase used to prepare the cheesy flavor component is a fungal lipase, the protease used to prepare the cheesy flavor component is a neutral bacterial protease, a fungal protease, or mixtures thereof, and the peptidase used to prepare the cheesy flavor component is from *Lactobacillus helveticus.*

38. The process as described in claim 36, wherein the first milk concentrate is also treated a high proteolytic activity culture and wherein the high proteolytic activity culture used to prepare the sulfury-cheddar flavor component is a Micrococcus.

39. The process as described in claim 37, wherein the first milk concentrate is also treated a high proteolytic activity culture and wherein the high proteolytic activity culture used to prepare the sulfury-cheddar flavor component is a Micrococcus.

40. A process for making a flavored cheese, said process comprising:
(1) forming a concentrate mixture containing one, two, or three cheese-favor concentrates selected from the group consisting of a sulfur-cheddar concentrate, a creamy-buttery concentrate, and a cheesy concentrate and wherein the cheese-flavor concentrate or concentrates in the first concentrate mixture are selected to achieve a desired flavor profile in the flavored cheese; and
(2) removing moisture from the concentrate mixture to a solids level of less than about 75 percent to form the flavored cheese,
wherein the flavored cheese does not require curing;
wherein the sulfur-cheddar concentrate is obtained by treating a first milk concentrate with a lactic acid culture at a temperature of about 70 to about 90° F. for about 10 to about 24 hours to obtain first mixture having a pH of about 5.4 or less, adding a sulfur-containing substrate to the first mixture to form a second mixture, treating the second mixture with a Brevibacterium culture or a yeast from the genera Debaromyces or Kluyeromyces, whereby the Brevibacterium culture or the yeast converts the sulfur-containing substrate to sulfur-containing flavor compounds, at a temperature of about 65 to about 86° F. for about 1 to about 10 days to form a third mixture, and treating the third mixture at a temperature sufficient to inactivate the cultures and enzymes in the third mixture to form the sulfury-cheddar flavor component;

wherein the creamy-buttery concentrate is obtained by treating a second milk concentrate with a lactic acid culture at a temperature of about 70 to about 90° F. for about 10 to about 24 hours to form a fourth mixture, adding sodium citrate to the fourth mixture to form a fifth mixture, treating the fifth mixture with a diacetyl-producing flavor culture at about 70 to about 90° F. for about 1 to about 10 days to form a sixth mixture, and treating the sixth mixture at a temperature sufficient to inactivate the cultures and enzymes in the sixth mixture to form the creamy-buttery flavor component; and wherein the cheesy concentrate is obtained by treating a third milk concentrate with a lipase, a protease, and a peptidase at a temperature of about 60 to about 140° F. for about 0.5 to about 10 days to form a seventh mixture and treating the seventh mixture at a temperature sufficient to inactivate enzymes in the seventh mixture to form the cheesy flavor component.

41. The process as defined in claim 40, wherein a cheese coagulant in a non-coagulating amount is added to the concentrate mixture prior to step (2).

42. The process as described in claim 40, wherein the concentrate mixture contains two or three of the cheese-favor concentrates.

43. The process as described in claim 40, wherein the moisture is removed from the concentrate mixture using evaporation.

44. The process as described in claim 42, wherein the moisture is removed from the second concentrate mixture using evaporation.

45. The process as described in claim 43, wherein the evaporation is carried out at a temperature of about 60 to 140° F. and a vacuum of about 10 to about 150 torr.

46. The process as described in claim 44, wherein the evaporation is carried out at a temperature of about 60 to 140° F. and a vacuum of about 10 to about 150 torr.

47. The process as described in claim 45, wherein the temperature for evaporation is about 68 to about 90° F.

48. The process as described in claim 46, wherein the temperature for evaporation is about 68 to about 90° F.

* * * * *